United States Patent [19]

Dwyer et al.

[11] 4,347,397

[45] Aug. 31, 1982

[54] TREATMENT OF EFFLUENT RESULTING FROM CONVERSION OF METHANOL TO GASOLINE IN ORDER TO DECREASE DURENE AND PRODUCE DISTILLATE

[75] Inventors: Francis G. Dwyer, West Chester; Albin Huss, Jr., Chadds Ford, both of Pa.

[73] Assignee: Mobil Oil Corporation, New York, N.Y.

[21] Appl. No.: 257,693

[22] Filed: Apr. 27, 1981

[51] Int. Cl.³ .................................................. C07C 5/22
[52] U.S. Cl. ...................................... 585/469; 585/475; 585/477; 585/481
[58] Field of Search ................ 585/469, 477, 481, 475

[56] References Cited

U.S. PATENT DOCUMENTS

| | | | |
|---|---|---|---|
| 3,825,611 | 7/1974 | Wadley et al. | 585/481 |
| 3,848,009 | 11/1974 | Wadley et al. | 585/481 |
| 3,969,426 | 7/1976 | Owens et al. | 585/669 |
| 4,025,576 | 5/1977 | Chang et al. | 260/682 |

*Primary Examiner*—Thomas A. Waltz
*Assistant Examiner*—A. Pal
*Attorney, Agent, or Firm*—Charles A. Huggett; Michael G. Gilman; Charles J. Speciale

[57] ABSTRACT

A novel process for the reduction of durene produced in a methanol to gasoline conversion process is disclosed wherein either the total effluent from said process or a bottoms fraction containing durene is contacted with an isomerization catalyst at elevated temperatures in order to convert said durene.

12 Claims, No Drawings

TREATMENT OF EFFLUENT RESULTING FROM CONVERSION OF METHANOL TO GASOLINE IN ORDER TO DECREASE DURENE AND PRODUCE DISTILLATE

BACKGROUND OF THE INVENTION

This invention relates generally to the conversion of methanol so as to produce gasoline and, more particularly, to the treatment of all or a portion of the effluent obtained from said conversion process in order to decrease durene.

The conversion of methanol to gasoline is an important area of technology which has the potential of becoming even more important as the supply of crude oil is diminished and/or increased in price. Particularly advantageous catalysts which are utilized in the conversion of methanol to gasoline are a special class of crystalline aluminosilicate zeolite catalysts of which HZSM-5 is the most preferred member. There are many patents and publications which describe the conversion of methanol to gasoline over said special zeolites, including U.S. Pat. Nos. 3,931,349; 3,969,426; 3,899,544; 3,894,104; 3,904,916; 3,894,102; the disclosures of which are incorporated by reference.

One particular problem residing in the conversion of methanol to gasoline over ZSM-5 type zeolites is that durene is produced in amounts higher than that expected from $C_{10}$ aromatic equilibrium distributions. Once an aromatic ring is formed in the presence of unreacted methanol, alkylation to tetramethylbenzenes occurs rapidly, but the smaller higher melting durene molecule (1,2,4,5-tetramethylbenzene, melting point 175° F.) diffuses out of the ZSM-5 pore much more rapidly than isodurene (1,2,3,5-tetramethylbenzene) or prehnitene (1,2,3,4-tetramethylbenzene). There have been various proposals advanced in order to control or minimize the amount of durene which is produced in the catalytic conversion of methanol to gasoline.

The proposals for durene reduction have generally fallen into two broad categories. One approach to the problem has been to vary the reaction conditions regarding the conversion of methanol such that durene is not formed at all or formed in small amounts. Approaches of this type are represented by U.S. Pat. No. 4,025,576 wherein it is stated that durene formation is less in the conversion of methanol if methanol is first converted to olefins and the olefins thereafter convereted to gasoline.

The second approach with regard to durene control was not to attempt to control the amount of durene which was formed in the methanol to gasoline reaction but to process the durene so formed in order to diminish it. It is in this latter area that the novel process of this invention is operative and it represents an improvement over the heretofore practiced teachings of the prior art.

In this connection, U.S. Pat. No. 3,969,426 is concerned with a process for the diminishing of durene produced in a methanol to gasoline process by reacting a durene-containing stream with low boiling aromatics such as benzene and toluene in order to transalkylate and thereby diminish the durene content.

The novel process of this invention represents an improvement over the teachings of the above-mentioned U.S. patent in that no additional aromatics are required. The instant invention is not concerned with the reaction of a durene containing fraction with aromatics, but rather, is concerned with an isomerization process wherein the durene portion is isomerized to more valuable products. It is interesting to note that in the methanol to gasoline process involving conversion of methanol over a catalyst such as ZSM-5 such as disclosed in heretofore mentioned U.S. Pat. No. 3,969,426; that very little benzene is formed. Therefore, in order to carry out the process of U.S. Pat. No. 3,969,426 with regard to durene reduction, a source of benzene must be available in order to react with the durene containing fraction. The novel process of this invention completely obviates the problem of benzene supply and, in fact, it is carried out in the substantial absence of benzene, i.e. no greater than 5 weight percent and more preferably no greater than 1 weight percent.

DESCRIPTION OF THE PREFERRED EMBODIMENTS

The novel process of this invention is concerned with treatment of either the total effluent from a methanol to gasoline process or a durene-containing bottoms fraction (obtained from the total gasoline fraction by topping off at least a light olefinic fraction) by isomerization of the same at elevated temperature and pressures over conventional isomerization catalysts. Isomerization catalysts are extremely well known in the art and include both amorphous and crystalline materials. As is known in the art, the isomerization catalyst is a solid acid catalyst which contains pores large enough that they readily admit the tetramethylbenzenes for reaction. Examples of such catalysts which are operable in the novel process of this invention include amorphous catalysts such as silica-alumina, silica-magnesia, silica-zirconia, silica-alumina-magnesia, silica-alumina-zirconia, metal phosphates, etc., as well as crystalline aluminosilicate zeolites such as zeolite X, Y, ZSM-4, Zeolite Beta, ZSM-11, ZSM-12, etc. As is known in the art, it is preferable to base exchange the crystalline aluminosilicate zeolites with a source of hydrogen ions or ions capable of conversion thereto, such as ammonium ions. It is known that these materials can also contain other desirable cations, such as rare earth cations, calcium ions, magnesium ions, as well as mixtures of all the above.

It is to be understood that no novelty is claimed with regard to the isomerization catalyst per se since these materials are extremely well known in the art and all that is required is an acidic solid having a pore size sufficiently large that they will readily admit the tetramethylbenzenes for reaction.

The novel process of this invention is applicable to both fixed bed and fluid bed processes and a convenient way of carrying out the process is to cascade the total effluent from a methanol to gasoline process through a separate reactor or a separate zone containing an isomerization catalyst in order to effect isomerization of the durene.

The novel process of this invention is carried out at temperatures ranging from about 500° to 1000° F. and more preferably from 600° to 900° F., pressures ranging from 0 to 1000 psig and more preferably from 0 to 300 psig, at weight hourly space velocities ranging from 0.1 to 100 and more preferably from 0.1 to 10.0 WHSV.

Particularly preferred embodiments of this invention reside in subjecting the total gasoline derived from the conversion of methanol to a distillation process or a fractionation process in order to remove at least the light olefinic fractions. It may not always be advantageous to treat the total gasoline fraction since, quite obviously, the durene is concentrated at the higher boiling end and not at the light end. The exact point at which the total gasoline is cut is not narrowly critical and a dividing point can be at a temperature ranging from about 200° to about 400° F. A more preferred cut point is from 300° to 400° F. and more particularly preferred being at 350° F. The invention will be illustrated with respect to making an initial separation at 350° F., although it is to be understood that higher or lower temperatures can be used as set forth above. 350° F. + bottoms fractions obtained from a conventional methanol to gasoline operation obtained by fractionating the hydrocarbon product over said process is then isomerized over an isomerization catalyst at the conditions of temperature and pressure and space velocity previously set forth.

The following examples will illustrate the best mode now contemplated for carrying out the invention.

These examples will illustrate the aspect of the instant invention wherein the total effluent from the methanol to gasoline process is passed over an isomerization catalyst.

EXAMPLES 1-11

An isomerization reactor was placed downstream of a fluid methanol to gasoline reactor such that the total effluent from the methanol unit could be treated. The methanol to gasoline conversion reactor was operated at constant process conditions as follows:

775° F.
29 psig
1 WHSV

The catalyst in said methanol reactor was 40 weight percent of a ZSM-5 in a silica-alumina matrix.

The isomerization reactor contained conventional amorphous silica-alumina beads (90/10 $SiO_2/Al_2O_3$) and the temperature was varied while the space velocity was maintained constant at 0.375 WHSV—based on total feed.

As a control, experiments were also carried out wherein the methanol conversion reactor was operated at the same conditions but *without* an isomerization reactor downstream.

Additional operating conditions, as well as the results obtained, are shown in the following table.

lar runs wherein no isomerization catalyst was used. The data also illustrates that for silica-alumina, a temperature of at least 700° F. is necessary (at the space velocity used) in order for meaningful conversion of durene to take place. Thus, Example 6, wherein a temperature of 255° F. was used, resulted in no significant improvement over the comparison run without the isomerization step.

In Examples 1-11, $C_6$ and $C_7$ aromatic fractions of the feed to the isomerization unit were extremely low, i.e., less than 1.0 weight percent.

EXAMPLES 12-25

The process of Examples 1-11 was repeated with the exception that the isomerization catalyst was a crystalline aluminosilicate zeolite instead of amorphous silica-alumina. This catalyst is a commercial cracking catalyst identified as Durabead 9 which contains 7.2 weight percent rare earth exchanged zeolite Y (REY) in a silica-alumina matrix. The catalyst was steamed at 1290° F. for 14 hours prior to use. The methanol reactor was operated at the same conditions of Examples 1-11 and the isomerization reactor was operated at a constant space velocity of 0.31 WHSV while the temperature was varied.

The results, as well as additional operating conditions, are shown below:

TABLE 2

Results of Isomerization Exp. of Fluid MTG Product Using Durabead 9

| | | | Liquid Hydrocarbon | | | |
|---|---|---|---|---|---|---|
| Example | Time on Stream | Isom. Reactor Temp. | $C_3/C_3=$ | Aromatics wt. % | Durene wt. % | Durene wt. % of $C_{10}$ Aro. |
| 12 | 18 | 519 | 6.8 | 61.9 | 5.56 | 47.1 |
| 13 | 22 | 567 | 6.6 | 60.0 | 5.13 | 45.8 |
| 14 | 90 | 256 | 2.10 | 52.0 | 6.15 | 62.8 |
| 15 | 98 | 639 | 4.2 | 53.5 | 6.23 | 61.4 |
| 16 | 114 | 725 | 3.06 | 54.5 | 5.33 | 52.0 |
| 17 | 120 | 590 | 3.40 | 52.8 | 6.22 | 60.3 |
| 18 | 140 | 246 | 2.20 | 53.9 | 8.05 | 68.8 |
| 19 | 164 | 753 | 2.37 | 52.7 | 5.24 | 51.1 |
| 20 | 195 | 260 | 1.65 | 54.6 | 9.83 | 73.7 |
| 21 | 260 | 757 | 1.72 | 46.5 | 6.71 | 73.8 |
| 22 | 284 | 733 | 1.78 | 47.0 | 6.26 | 65.8 |
| 23 | 311 | 364 | 1.19 | 44.6 | 7.86 | 83.2 |
| 24 | 332 | 871 | 1.24 | 50.2 | 4.10 | 42.5 |
| 25 | 357 | 267 | 1.18 | 46.0 | 8.55 | 86.5 |

TABLE 1

Results of Durene Isomerization Experiment Using $SiO_2/Al_2O_3$ Beads

| | | | ISOMERIZATION | | | | NO ISOMERIZATION | | | | |
|---|---|---|---|---|---|---|---|---|---|---|---|
| | | | Liquid Hydrocarbon | | Total Hydrocarbon | | Liquid HC | | | Total HC | |
| Example | Time on Stream Hrs. | Isom. Reactor Temp. °F. | $C_3/C_3=$ | Aromatic Wt. % | Durene Wt. % | Durene Wt. % of $C_{10}$ Arom. | Time Hrs. | $C_3/C_3=$ | Aromatics Wt. % | Durene Wt. % | Durene Wt. % of $C_{10}$ Arom. |
| 1 | 4 | 740 | 9.8 | 71.2 | 6.11 | 3.97 | 39.6 | 4 | 9.9 | 70.0 | 3.87 | 45.3 |
| 2 | 28 | 719 | 3.5 | 60.1 | 4.91 | 3.19 | 40.2 | 26.5 | 4.25 | 59.9 | 3.64 | 55.0 |
| 3 | 73 | 797 | 1.8 | 52.5 | 4.59 | 2.98 | 40.8 | | | | | |
| 4 | 96 | 735 | 1.7 | 48.8 | 5.41 | 3.52 | 52.9 | 99.5 | 1.6 | 51.2 | 4.26 | 75.3 |
| 5 | 102 | 367 | 1.42 | 45.8 | 6.72 | 4.37 | 70.0 | | | | | |
| 6 | 122 | 255 | 1.21 | 46.6 | 7.95 | 5.17 | 75.9 | 122 | 1.37 | 50.2 | 4.43 | 76.0 |
| 7 | 127 | 604 | 1.34 | 45.4 | 7.04 | 4.58 | 71.8 | | | | | |
| 8 | 144 | 747 | 1.34 | 44.9 | 5.17 | 3.36 | 54.8 | | | | | |
| 9 | 168 | 317 | 0.83 | 41.5 | 7.74 | 5.03 | 82.4 | | | | | |
| 10 | 150 | 707 | 1.41 | 46.6 | 6.18 | 4.02 | 60.7 | | | | | |
| 11 | 192 | 800 | 1.03 | 46.5 | 5.32 | 3.46 | 54.3 | | | | | |

The above table shows the benefits arising from the novel process of this invention. Thus, in Examples 1, 2 and 4 the percentage of durene in the $C_{10}$ aromatics fraction decreased significantly when compared to simi- The above table dramatically illustrates that the percentage of durene in the $C_{10}$ aromatic portion of the product can be significantly lowered utilizing the novel process of this invention. The above table also illustrates the criticality of temperature in the novel process of this invention, but it is difficult to assign a specific temperature due to the fact that as is well known in the art the longer catalyst is on stream the more that it tends to age and therefore requires higher temperatures as the run progresses. In this connection, note, for example, that Example 12 illustrates that a temperature of 519° is completely adequate to effect durene reduction even after 18 hours on stream. However, after 98 hours on stream, i.e. Example 15, a temperature of 639° is not as effective as the 519°. Conversely, Example 16 illustrates that even after 114 hours on stream if one were to raise the temperature to 725°, durene reduction can be obtained. No significant durene reduction was obtained at Example 14, i.e. temperatures of 256° nor in Examples 18, 20, 23 and 25. These temperatures were simply too low.

The effectiveness of the process can be further highlighted by comparing the above table with the results obtained in Examples 1-11. Thus, for example, after 22 hours on stream with the rare earth Y the weight percent of durene in the $C_{10}$ aromatic fraction was 45.8% (Example 13). Contrast this with Example 2 which did not have any isomerization catalyst and, as can be seen, after 26.5 hours, the weight percent durene was 55%. In like manner, Example 15 is an example directed towards 98 hours on stream and, as can be seen, the weight percent durene in the $C_{10}$ fraction was 61.4. Contrast this with Example 4 wherein without any isomerization catalyst, the weight percent durene was 75.3. In like manner, Example 17 is directed towards a run which had been on stream for 120 hours and, as can be seen, the weight percent of durene in the $C_{10}$ fraction was only 60.3 weight percent. Compare this to Example 6 in Table 1 wherein in an operation without any isomerization after 122 hours on stream the weight percent of durene in the $C_{10}$ fraction was 76%.

EXAMPALE 26-34

These examples will illustrate the novel process of this invention wherein only a portion of the total effluent from the methanol to gasoline process is contacted with an isomerization catalyst. In all the Examples which follow, a 350°+ bottoms fraction from a methanol to gasoline process was the feed material used for the isomerization experiments.

The isomerization catalyst used in Examples 26-34 was an acid exchanged ZSM-11 zeolite which was composited with 35 weight percent alumina in order to form 1/16" extrudate.

All runs were carried out at a pressure of 50 psig while the temperature was varied. Additional operating conditions, as well as analysis of the 350°+ feed material together with the results obtained are set forth in the following table.

TABLE 3

| Example | 350° F.+ BTM-Feed | 26 | 27 | 28 | 29 | 30 | 31 | 32 | 33 | 34 |
|---|---|---|---|---|---|---|---|---|---|---|
| Operating Conditions | | | | | | | | | | |
| Temp., °F. | | 550 | 600 | 650 | 700 | 700 | 700 | 750 | 750 | 750 |
| WHSV, hr$^{-1}$ | | 1 | 1 | 1 | 1 | 1 | 1 | 1 | 1.6 | 3 |
| Time on Stream, hrs. | | 24 | 30 | 48 | 72 | 120 | 144 | 168 | 173 | 180 |
| Product Analysis: | | | | | | | | | | |
| Liquid Product, Wt. % | | | | | | | | | | |
| $C_5-$ | 0.08 | 0.69 | 1.52 | 1.35 | 1.44 | 1.42 | 1.22 | 0.84 | 0.60 | .34 |
| $C_6+$ | 99.92 | 99.31 | 98.48 | 98.65 | 98 | 98.59 | 98.78 | 99.16 | 99.40 | 99.66 |
| Benzene | — | 0.73 | 0.52 | 0.69 | 0.77 | 0.72 | 0.56 | 0.73 | 0.54 | 0.11 |
| Toluene | — | 4.00 | 2.75 | 3.78 | 4.48 | 4.04 | 3.50 | 3.72 | 2.0 | 0.58 |
| $C_8$ Arom. | 0.17 | 6.61 | 9.24 | 11.10 | 11.48 | 10.63 | 8.63 | 9.70 | 8.20 | 6.22 |
| $C_9$ Arom. | 20.26 | 17.07 | 17.71 | 16.71 | 15.67 | 16.03 | 17.22 | 16.95 | 18.02 | 17.2 |
| $C_{10}$ Arom. | 68.58 | 58.27 | 61.38 | 59.60 | 58.84 | 60.05 | 60.35 | 60.74 | 62.67 | 61.5 |
| Durene | 51.84 | 34.06 | 28.91 | 24.27 | 24.38 | 25.96 | 32.48 | 29.35 | 39.51 | 43.8 |
| 1,2,3,5 TMB | 6.75 | 15.88 | 23.51 | 27.03 | 26.02 | 25.35 | 18.97 | 22.36 | 14.59 | 10.30 |
| 1,2,3,4 TBB | 0.56 | 4.44 | 6.06 | 6.03 | 6.10 | 6.58 | 6.10 | 6.85 | 5.38 | 3.45 |
| $C_{11}$ Arom. | 9.74 | 3.54 | 4.54 | 3.62 | 4.60 | 4.55 | 6.26 | 4.93 | 6.09 | 4.63 |
| Naphthaline | 0.30 | .78 | 0.97 | 1.03 | 0.95 | 0.88 | 0.96 | 0.85 | 1.04 | .70 |
| M-Naphthyl | — | .23 | 0.54 | 0.78 | 0.92 | 0.71 | .39 | 0.66 | 0.30 | .15 |
| Unknown Arom. | — | .01 | 0.64 | 1.22 | 0.65 | 0.82 | .32 | 0.49 | 0.17 | — |
| Total Arom. | 99.04 | 99.22 | 98.29 | 98.55 | 98.36 | 98.45 | 98.11 | 99.77 | 99.03 | 99.59 |

As can be seen from the above table, the feed material contained 51.84 weight percent durene and in each experiment the durene content was significantly lowered. In general, higher temperatures favor more complete durene reduction but it is noted that as the catalyst is on stream more and more, it ages such that higher temperatures may be required to compensate for the decline of its isomerization activity. Thus, in Example 29, after 72 hours on stream a temperature of 700 resulted in a significant durene reduction, i.e. from 51.84 weight percent to 24.38 weight percent. However, as can be seen from Examples 30 and 31, as the catalyst aged, the durene content went up. Example 32 demonstrates that by raising the temperature, the durene reduction could again be enhanced.

EXAMPLES 35-38

The process of Examples 26-34 was repeated utilizing the same feed material, i.e. the 350+ bottoms fraction but the isomerization catalyst used was 65 weight percent HZSM-4 in an alumina binder in the form of 1/25" extrudates.

In these experiments, the pressure was maintained at 250 psig and the space velocity in all cases was 1 WHSV. The temperature was varied during the runs and the results obtained are shown in the following table:

TABLE 4

| Example | 35 | 36 | 37 | 38 |
|---|---|---|---|---|
| Operating Conditions | | | | |
| Temp., °F. | 500 | 550 | 550 | 600 |

TABLE 4-continued

| Example | 35 | 36 | 37 | 38 |
|---|---|---|---|---|
| Time on Stream, hr. | 25 | 60 | 76 | 98 |
| Product Analysis | | | | |
| Liquid Product, Wt % | | | | |
| $C_{5-}$ | 0.06 | 0.39 | 0.13 | 0.08 |
| $C_{6+}$ | 99.94 | 99.61 | 99.87 | 99.92 |
| Benzene | — | 0.0 | 0.0 | 0.0 |
| Toluene | — | 0.24 | 0.2 | 0.19 |
| $C_8$ Arom. | 0.84 | 1.36 | 1.17 | 1.19 |
| $C_9$ Arom. | 19.36 | 20.61 | 19.78 | 20.48 |
| $C_{10}$ Arom. | 70.24 | 65.59 | 69.03 | 66.78 |
| Durene | 45.23 | 24.85 | 38.55 | 28.19 |
| 1,2,3,5 TMB | 13.24 | 26.49 | 17.98 | 23.57 |
| 1,2,3,4 TMB | 3.23 | 5.74 | 4.19 | 5.71 |
| $C_{11}$ Arom. | 7.90 | 7.85 | 7.44 | 7.83 |
| Naphthaline | 0.96 | 1.61 | 0.68 | 1.93 |
| M-Naphthyl | — | 0.04 | 0.0 | .12 |
| Unknown Arom. | 0.06 | 0.66 | 0.03 | .45 |
| Total Arom. | 99.36 | 97.95 | 99.01 | 98.97 |

As can be seen from the above table, durene reduction was achieved in each case. In general, the durene reduction increased with increasing temperatures, i.e. compare Example 35 wherein at a temperature of 500° F., durene reduction went from 51.84 weight percent to 45.23 weight percent. Examples 36, 37 and 38 wherein higher temperatures were used, i.e. 550° and 600° F., resulted in more significant durene reduction.

Although in the foregoing examples the conversion of durene is described as isomerization, it is known to those skilled in the art that concomittant to the isomerization of alkyl aromatics, disproportionation of the alkyl aromatics also occurs. The ratio of the amount of isomerization relative disproportionation occurring is dependent upon the catalyst of choice and the process operating conditions.

What is claimed is:

1. In the process for the conversion a methanol to gasoline over a ZSM-5 type zeolite wherein methanol is contacted with said zeolite at elevated temperature in order to effect conversion to gasoline with a concurrent formation of durene, the improvement which comprises: contacting a liquid fraction comprising a durene containing fraction of the effluent from said methanol-to-gasoline conversion process and further comprising less than about five percent by weight benzene with a solid acidic isomerization catalyst having a pore size sufficiently large to admit tetramethylbenzenes at elevated temperatures ranging from about 500° to 1000° F. so as to effect isomerization of said durene to produce 1,2,3,4- and 1,2,3,5-tetramethylbenzenes and thereby diminish the same.

2. The process of claim 1 wherein the total effluent from said methanol to gasoline conversion process is contacted with said conversion catalyst.

3. The process of claim 1 wherein only a portion of the liquid product from said methanol to gasoline conversion is contacted with said conversion catalyst.

4. The process of claim 3 wherein said liquid fraction has a boiling point greater than about 200°–400° F.

5. The process of claim 3 wherein said liquid fraction has a boiling point greater than about 300°–400° F.

6. The process of claim 3 wherein said liquid fraction has a boiling point greater than about 350° F.

7. The process of claim 1 wherein said conversion catalyst is a solid acidic amorphous material.

8. The process of claim 1 wherein said conversion catalyst is a solid acidic crystalline material.

9. The process of claim 7 wherein said solid is selected from the Group consisting of silica-alumina, silica-magnesia, silica-zirconia, and mixtures thereof.

10. The process of claim 9 wherein said amorphous solid is silica alumina.

11. The process of claim 8 wherein said solid acidic crystalline material is a crystalline aluminosilicate zeolite selected from the group consisting of zeolite X, zeolite Y, ZSM-4, zeolite Beta, ZSM-11, and ZSM-12.

12. The process of claim 11 wherein said crystalline material is a rare earth exchanged zeolite Y.

* * * * *